Aug. 4, 1931.  A. D. ANGELIDES  1,816,813
TRAFFIC SIGNAL FOR MOTOR VEHICLES
Filed Dec. 22, 1922   2 Sheets-Sheet 1
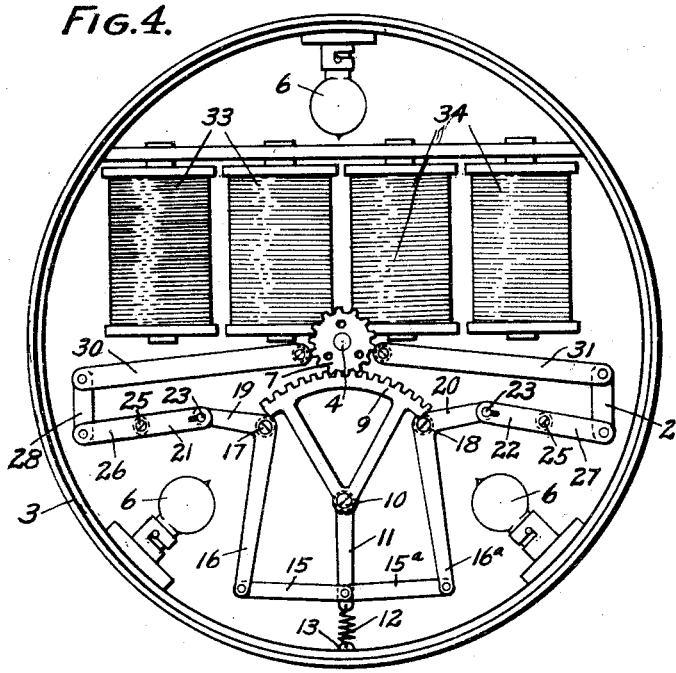
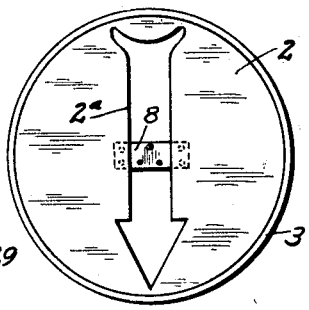
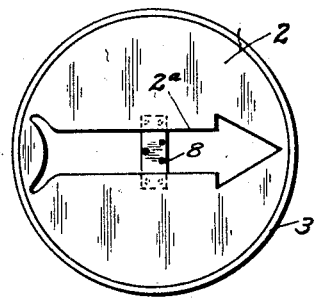
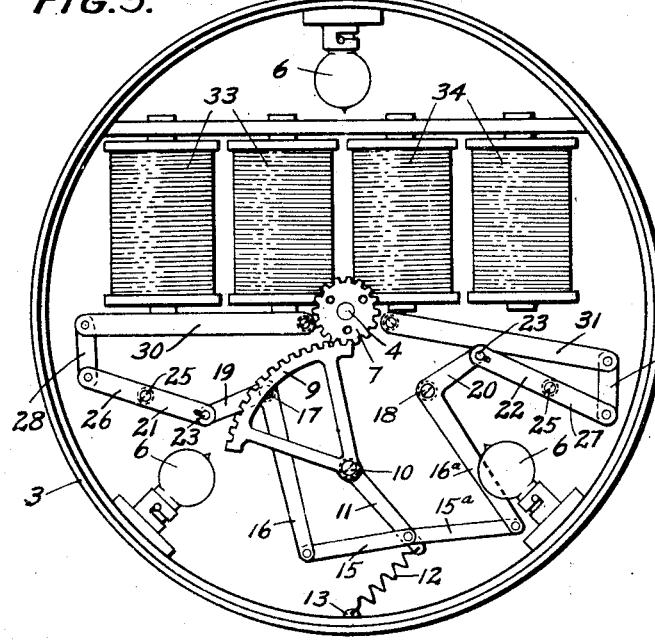
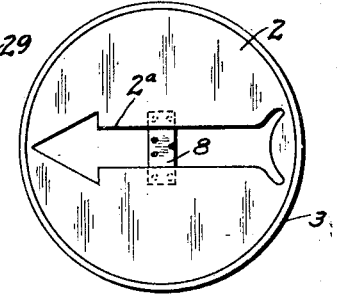
INVENTOR
A. D. ANGELIDES
BY Hazard and Miller
ATT'YS.

Aug. 4, 1931.  A. D. ANGELIDES  1,816,813
TRAFFIC SIGNAL FOR MOTOR VEHICLES
Filed Dec. 22, 1922   2 Sheets-Sheet 2
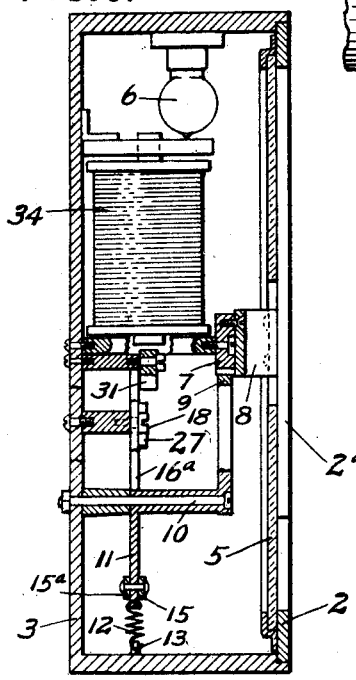
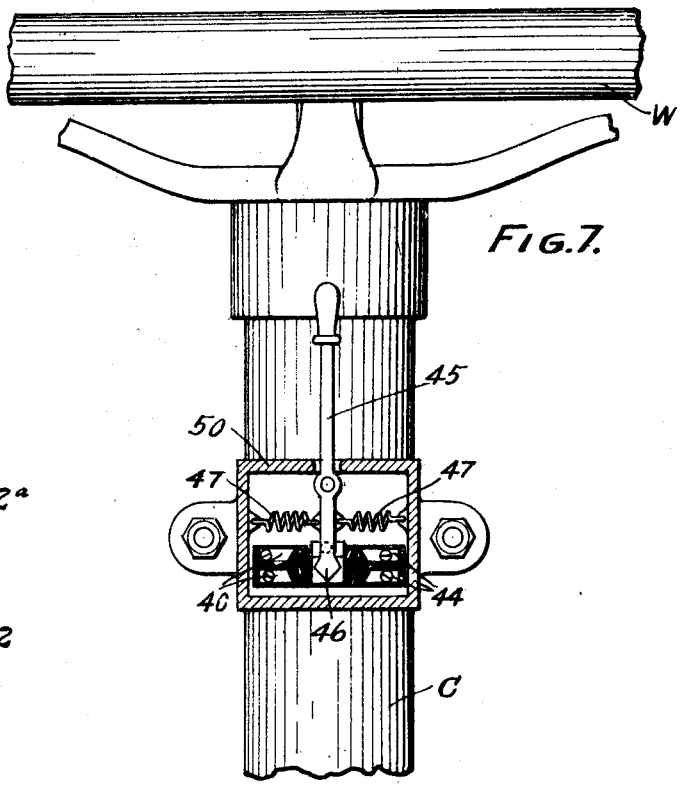
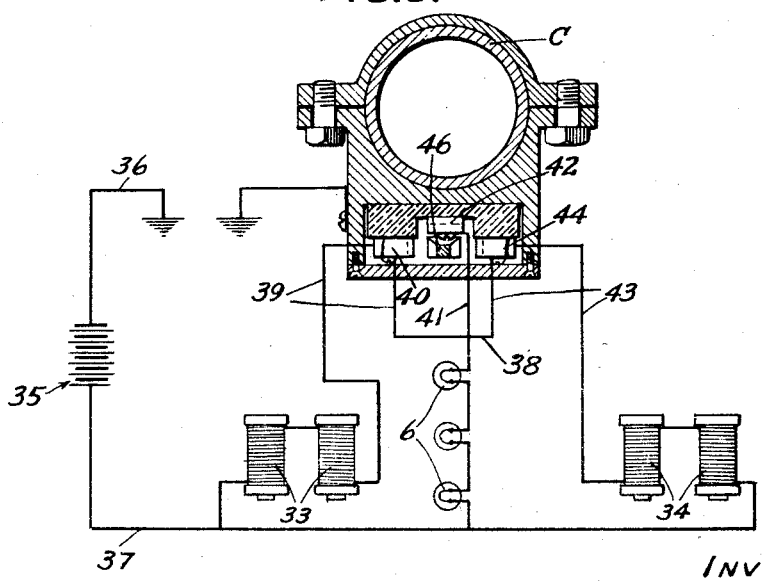
INVENTOR
A.D. ANGELIDES.
BY Hazard and Miller
ATT'YS.

Patented Aug. 4, 1931

1,816,813

UNITED STATES PATENT OFFICE

ANGELOS D. ANGELIDES, OF SANTA BARBARA, CALIFORNIA

TRAFFIC SIGNAL FOR MOTOR VEHICLES

Application filed December 22, 1922. Serial No. 608,478.

This invention relates to traffic signals for motor vehicles and has for its object to provide a manually controlled electromagnetically operated direction and control signal to indicate to traffic the intention of the operator of a road vehicle as to movements of the same.

Another object of the invention is to provide a traffic signal including a movable pointer adapted to be quickly thrown into effective signalling positions.

Another object is to provide a signalling apparatus including a single main control lever for energizing the signal setting means.

Other objects and advantages will be made manifest in the following specification of an embodiment of the invention illustrated in the accompanying drawings, wherein:

Figure 1 is a face view of the indicator of the apparatus showing the pointer thereof in the "stop" position.

Fig. 2 is a face view of the indicator showing the pointer in the "right turn" position.

Fig. 3 is a face view of the indicator showing the pointer in the "left turn" position.

Fig. 4 is an elevation showing the pointer operating means in normal free position.

Fig. 5 is a similar view showing the pointer operating mechanism in the "left turn" setting position.

Fig. 6 is a vertical section from front to rear of the pointer setting mechanism.

Fig. 7 is a view showing in elevation fragments of the steering column and steering wheel and showing in section the switch box to disclose the switch contacts.

Fig. 8 is a diagrammatic view showing a wiring system and showing the switch box and steering column in cross section.

In the present embodiment of the invention, an indicating member 2 is mounted in a shell or casing 3 in which there is provided a mechanism including a shaft or spindle 4 arranged axially in the shell 3 and to which the member 2 is secured. The indicating member is preferably formed of a rotatable disc having a diametrical opening $2^a$ in the form of an arrow and over the inside of this opening there is arranged a translucent window 5 so that when a series of light bulbs 6 in the shell 3 are energized, the rays passing through the arrow window will illuminate the same to give the desired signal. The shaft 4 is shown as provided with a pinion 7 to which may be secured a transverse bracket 8 fastened to the indicating member 2, so that this member will be rotated by and with the shaft 4 and its pinion 7.

The indicating arrow $2^a$ is normally maintained in a vertical and stop position, as shown in Fig. 1, by suitable means including a quadrant of a gear 9 meshing with the pinion 7 and being mounted on a pivot pin or support 10. Extending diametrically oppositely from the quadrant 9 is a radial arm 11 to the lower end of which is connected a contractile spring 12, one end of which is fixed to a stationary support 13 in the bottom of the shell 3. Therefore, the spring tends to pull the radial arm 11 into alignment with itself and this swings the quadrant 9 to a neutral position, Fig. 4, and turns the pinion 7 so as to position the indicating arrow in stop position.

For the purpose of instantly swinging the indicating arrow or signal member to a right or left turn position, means are provided for actuating the quadrant 9 and such means are here shown as including oppositely extending links 15 and $15^a$ attached to the outer end of the radial arm 11. The remote ends of the links are attached to lever arms 16 and $16^a$, respectively, these lever arms having pivots 17 and 18 and also having outwardly extending lever arms 19 and 20. These lever arms 19 and 20 are connected to contiguous lever arms 21 and 22, the ends of which are slotted to receive connecting pins 23. The lever arms 21 and 22 are mounted on pivots 25 and from which extend arms 26 and 27.

The lever arms 26 and 27 are connected by links 28 and 29 to the outer swinging ends of armatures 30 and 31, the inner ends of which are pivoted on suitable supports contiguous to the central shaft 4 of the pinion 7.

Above each of the armatures 30 and 31 is provided a set of electromagnets 33 and 34 and when the respective sets are energized, their armatures will be attracted and their movement will result in swinging the radial arm 11 of the quadrant 9 in one direction or the other to effect a rotation of the pinion 7 to a suitable degree.

For energizing the magnet sets 33 and 34, a suitable electrical circuit is shown as including a source of current as a battery 35 having a grounded side 36, the opposite side of the battery being provided with a wire 37 branched in parallel to the magnets 33, the light bulbs 6 and to the magnets 34, as clearly shown in Fig. 8. A common connection 38 connects the magnets 33, the bulbs 6 and the magnets 34 on one side and this common connection has a wire 39 to a contact 40, another wire 41 leads to a contact 42, and another wire 43 leads to a contact 44. The contacts 40, 42 and 44 are selectively engageable to close the circuit through the ground by a single switch element having a handle 45 and a contact engaging terminal 46. The terminal 46 is normally held clear of the associated contacts 40, 42 and 44 as by means of springs 47; the contacts and said springs all being disposed in a suitable switch box 50 through which the handle 45 extends. The switch box for convenience may be mounted on the steering column C, at the top of which is the steering wheel W.

In operation, if the driver of the vehicle desires to stop the machine, he then simply pulls the handle 45 which throws the switch terminal 46 into engagement with the contact 42 which is connected by wire 41 to the light or bulb circuit; the handle being mounted so that when the switch terminal 46 engages the contact 42, the bulb circuit alone will be energized. This will result in illuminating the interior of the signal shell 3 and the translucent part 5 will permit the passage of rays through the signal window $2^a$ which at its normal position will indicate a stop.

To make a left hand turn the driver throws his switch handle 45 sidewise to energize the magnets 33 by bringing the switch arm terminal 46 into engagement with the contact 40 which closes the circuit of the magnets 33 alone and results in the attraction of the armature 30. This results in the rotation of the pinion 7 to swing the indicating member 2 to the position shown in Fig. 3.

To indicate a right hand turn as shown in Fig. 2, the switch lever 45 is thrown so as to move the switch terminal 46 into contact with the contact 44 which closes the circuit of the magnets 34 thereby attracting the armature 31 and swinging the indicating member 2 so as to position the signal window $2^a$ as is shown in Fig. 2. As soon as the energized magnet circuits are broken the signal member 2 will be restored to the normal stop indicating position by the spring 12 and the switch arm 45 will be brought to neutral open position by its springs 47; the light bulbs being deenergized with the result that no signal will be effectively displayed by the signal device 2.

While the main switch arm 45 can be moved in one direction to close the light circuit through the line 41 alone, when the switch terminal 46 is thrown into engagement with either contact 40 or 44, the respective sets of magnets will be energized and since the bulbs 6 are connected in parallel to the magnet circuits, the bulbs will be concurrently energized with either magnet circuit.

Further embodiments, modifications and variations may be resorted to within the spirit of the invention as here claimed.

What is claimed is:

1. In a traffic signal for motor vehicles a shell having a cylindrical wall, a flat back and an open front, a pair of electromagnets having their operative poles mounted in substantially a horizontal plane, a shaft mounted in the said wall below the electromagnets and centrally positioned in relation to such magnets, a pinion fixed on the shaft, a single indicator connected to the pinion, a gear sector mounted on a pivot below the shaft, such sector meshing with the pinion, a radial arm rigid with the sector extending in the opposite direction from the pivot, a retractile spring connecting the outer end of the arm to the shell, armatures mounted on pivots adjacent the shaft and extending in opposite directions therefrom, such armatures being positioned in relation to the poles of the magnets to be actuated thereby, and an interlinking mechanism between the armatures and the radial arm to operate the arm on operating movement of the armatures and hence rotate the sector, the pinion, the shaft and the indicator.

2. In a traffic signal for motor vehicles a shell having a cylindrical wall, a flat back and an open front, a pair of electromagnets having their operative poles mounted in substantially a horizontal plane, a shaft mounted in the said wall below the electromagnets and centrally positioned in relation to such magnets, a pinion fixed on the shaft, a single indicator connected to the pinion, a gear sector mounted on a pivot below the shaft, such sector meshing with the pinion, a radial arm rigid with the sector extending in the opposite direction from the pivot, a retractile spring connecting the outer end of the arm to the shell, armatures mounted on pivots adjacent the shaft and extending in opposite directions therefrom, such armatures being positioned in relation to the poles of the magnets to be actuated thereby, a first link connected to each armature, a centrally pivoted link lever having one end connected to each link, a bell crank connected to the other end of each centrally pivoted lever, and links connecting the bell cranks and the radial arm whereby on actuation of the armatures the radial arm is moved, hence rotate the sector, the pinion, the shaft and the indicator.

In testimony whereof I have signed my name to this specification.

ANGELOS D. ANGELIDES.